United States Patent [19]

Nelson

[11] Patent Number: 4,740,025
[45] Date of Patent: Apr. 26, 1988

[54] COMPOUND GRIPPER DEVICE

[75] Inventor: Kenneth J. Nelson, North Attleborough, Mass.

[73] Assignee: Zymark Corporation, Hopkinton, Mass.

[21] Appl. No.: 947,192

[22] Filed: Dec. 29, 1986

[51] Int. Cl.⁴ .............................................. B25J 15/00
[52] U.S. Cl. ................................. 294/99.1; 294/902; 901/39
[58] Field of Search ................... 294/1.1, 27.1, 28, 33, 294/82.36, 86.4, 99.1, 100, 106, 119.1, 119.3, 902; 269/266, 267, 275; 901/31, 39

[56] References Cited

U.S. PATENT DOCUMENTS

| | | | |
|---|---|---|---|
| 2,609,113 | 9/1952 | Huffman | 294/99.1 X |
| 2,735,713 | 2/1956 | Blakeley | 294/119.1 |
| 2,896,994 | 7/1959 | Fischer | 294/902 X |
| 3,778,094 | 12/1973 | Grolet et al. | 294/902 X |
| 4,353,537 | 10/1982 | Koufos | 269/266 |

FOREIGN PATENT DOCUMENTS

| | | | |
|---|---|---|---|
| 2919407 | 11/1980 | Fed. Rep. of Germany | 294/902 |
| 739719 | 11/1955 | United Kingdom | 294/902 |
| 496222 | 12/1975 | U.S.S.R. | 294/902 |
| 889423 | 12/1981 | U.S.S.R. | 294/902 |
| 921767 | 4/1982 | U.S.S.R. | 294/902 |

*Primary Examiner*—Johnny D. Cherry
*Attorney, Agent, or Firm*—Andrew F. Kehoe

[57] ABSTRACT

Improved compound gripper device particularly useful with laboratory glassware and suitable for use with low or high gripping forces. When gripping forces are high, external gripper member is displaced into a resilient gripping pad which pad is of the type which provides the high-friction gripping force. On release of the gripping force, the external member is released and serves as a means to provide positive displacement of the object being held from the resilient, high-friction, gripping element.

10 Claims, 2 Drawing Sheets

COMPOUND GRIPPER DEVICE

BACKGROUND OF THE INVENTION

This invention relates to an improved compound gripper means of the type used, for example, on remote manipulators and robotic devices. The gripper comprises a way to assure release of a smooth article from a high-friction gripping surface which surface also tends, too often, to adhere to the article being gripped.

In recent years, a considerable amount of work has gone into laboratory robots. Systems have been developed for robotic methods for carrying out automatic pipetting, filtering, dilutions, spectometry, titrations of various sorts, and other automatic procedures involving organic synthesis, testing, and sample preparation. Much of the robot-automated work is preparative in nature and more of it is in the nature of providing analytical systems for use in a wide variety of applications such as analysis of polymers, food samples, extraction of drugs from biological fluids and so on. A large number of such procedures are described in *Advances in Laboratory Automation Robotics* (Zymark Corporation, Hopkinton, Mass., 1985).

As the work in laboratory robotics proceeded, various devices were developed which put increased demands on the fundamental equipment normally associated with robotic manipulation. For example, a lab bottle capper is described in U.S. Pat. No. 4,607,196 to Abrahams and Carll which required that a gripper of lab containers hold the container sufficiently tight to accommodate the unscrewing of container caps. Another change which took place, as the implementation of robotics-automated processes became more widespread, was the increasing unpredictability of the exact container that might be used with a given gripper. This made it impossible to determine the gripping pressure which would be used by a particular apparatus.

One result of these changes was that there was a small, but unacceptable, number of incidents where a container stuck to the surface of a gripper when it was to be released. Such grippers were often surfaced with polyurethane gripper pads, usually cast in place and having the desirable high-static-friction gripping properties required for secure holding of vials, test tubes, and bottles, etc.

Such tube-sticking problems usually manifested themselves when these somewhat organic resilient organic resin pads were used on the grippers. The inherent properties of some otherwise-desirable resinous pad materials promoted the undesirable sticking action. However, particularly in the laboratory environment, exposure to the environment can also promote the formation of sticky surfaces on pads.

The present inventor addressed himself to providing a gripper that would be free of such sticking problems but would maintain its gripping efficiency.

SUMMARY OF THE INVENTION

It is a principal object of the present invention to provide an improved mechanical gripper comprising a positive article-release feature.

It is a further object of the invention to provide a compound gripper comprising a plurality of effective gripping actions and gripping strengths.

Another object of the invention is to provide a gripper particularly useful in automated handling of laboratory glassware and useful to achieve a firm gripping action, and a dependable release of glassware from the gripper, while maintaining benefits of a resilient organic resin gripper pad.

A further object of the invention is to provide a superior gripping process particularly valuable in the automated handling of containers and laboratory implements.

Other objects of the invention will be obvious to those skilled in the art on their reading of this disclosure.

The above objects have been substantially achieved by providing a gripping means wherein each opposed gripper member has two gripping elements, a first of which is a resilient pad member of relatively large gripping area and forming a relatively-high-friction grip means and a second of which is an element of relatively-low-gripping area. The second element is the first to contact the article to be gripped and, most importantly, the last to relinquish contact with the article.

The resilient pad member, in the most advantageous mode of the invention, forms means to support and cushion, and bias outwardly, the second element as the second element is forced backwardly into the resilient pad during the gripping of an article. The pad, or pads in many cases, are conveniently formed of a resilient organic resin, say a polyurethane. As the gripping action tightens, the second element, which can be a wire, is pushed into a position deep enough into the pad so the pad itself contacts the surface of the article and becomes the principle gripping means. On release of the gripping force, the resilient pad serves as means to push the second element out from the pad surface, thereby pushing the article away from the resilient pads and assuring no bonding force can exist between a tacky pad and the article being released from the gripper.

It will be understood that the gripping element of low surface area, i.e. the element, the one normally extending beyond the gripping face of the first element when the gripper member is not being used, need not be a spring. It can be suitably biased and moved by the resilient pad. However, use of spring wires and other spring loaded devices can be used if necessary or desirable for a particular application.

The apparatus of the invention provides a means to apply a number of gripping forces to a container. As the gripping device closes, the exterior biased element, suitably a wire, serves to provide a light grip. As the wire is moved backwardly into the pad, the grip pressure gradually increases in response to the forces required to compress a portion of the pad, but the effectiveness of the grip is still limited by the small area of contact between the spring and the container. It is not until the surface of the resilient pad element comes into contact with the container that the major qualitative change in gripping strength becomes operative. This change is assignable not only to the increased gripping pressure and gripping area, but also to the higher frictional resistance between the article being gripped and the resilient pad.

The resilient pad can be formed of a number of materials including organic resin systems such as polyurethanes, the aromatic polyesters such as those sold under the tradename Vitel PE-200 by Goodyear Tire & Rubber Company, and blends of such materials. Moreover, a large number of resin-based pad materials are available, pre-fabricated, to the robot industry from known commercial sources.

In some cases the pad, i.e. the internal element of the gripping member, can be a not-very-resilient cushion material, for example felt or the like. However, such materials do not provide optimum cushioning means and are more readily fouled by spillage in a laboratory environment. Nevertheless, in a case which one wishes to use such a non-resilient cushion as a principal gripping surface, the external element, e.g. a wire spring can act as a spring and be the biasing means. In such an embodiment, a spring wire, normally positioned to contact an article outside the principle gripping surface of the second element, could be pushed backwardly into a cushion until the container, or other article, is securely gripped by the cushion, then the wire would push outwardly beyond the surface of the cushion because of its inherent spring properties.

Thus, the inventors have provided a tool comprising two opposed gripping members, moveable relative to one another, between article gripping and article release positions. At least one of, preferably each of the gripping members, are outfitted with a pad element having a gripping surface which acts as a first gripping element. A second gripping element, one having smaller gripping area than the pad element, is mounted on the gripping member in such a way that its gripping surface is in a normal position close to the other of the opposed gripping members than is the gripping surface of the pad. (That is to say it is nearer the item to be gripped.) This second gripping member is displaceable into the structure of the pad when gripping force is applied to the tool. On such displacement, the surface of the pad becomes the primary gripping surface becuase of the aforesaid displacement of the second gripping member. The tool comprises mechanical biasing means within the pad structure, or inherently biasing (resilient) features of the pad material itself. Thus, when gripping forces are being released, the second gripping member is pushed out of the pad and briefly becomes the primary gripping force, thereby forcing the object being gripped away from the sometimes tacky or sticky surface of the pad.

ILLUSTRATIVE EMBODIMENT OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for the purposes of illustration in order that others skilled in the art will more fully understand the invention and the principles thereof and will be able to modify it and embody it in a variety of forms, each as may be best suited to the condition of a particular case.

IN THE DRAWINGS

Figure 2:
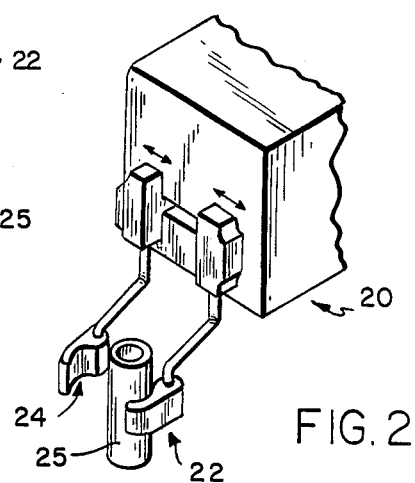
FIG. 2 illustrates a typical arrangement of a gripper member adapted for robotic manipulation showing how a tube can stick to a gripper member.

As seen in FIG. 2, a typical gripper tool 20 is formed of two opposed gripper elements 22 and 24, which are mounted to move back and forth to grip and release a glass vial 25. Gripper elements for such tools may be suitably constructed according to the following description.

Figure 1:
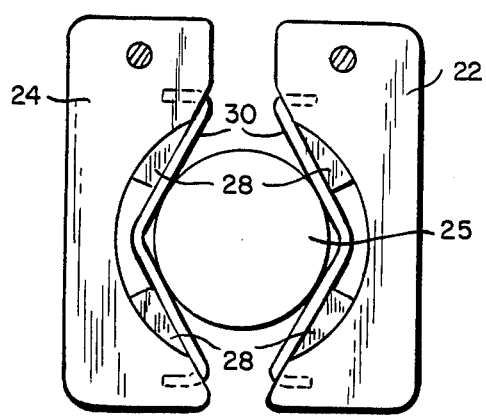
FIG. 1 is a plan view of a two opposed gripper members forming a gripper tool according to the invention.
Figure 3:
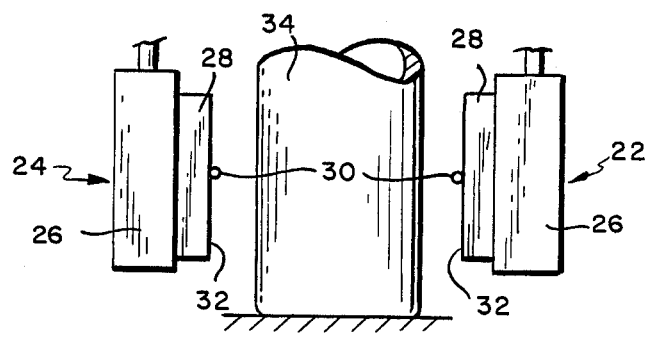
FIG. 3 illustrates, schematically, a wire spring/resilient pad gripper member constructed according to the invention and in article-release position.

Referring to FIGS. 1 and 3, each gripper element 22 and 24 comprises a metal base member 26 and, adhesively attached thereto, two resilient gripper pads 28 formed of tough, resilient, polyurethane resin composition.

Figure 4:
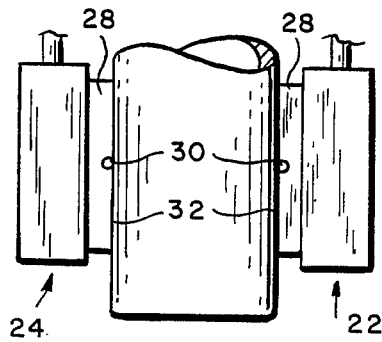
FIG. 4 illustrates, again schematically, the gripper of FIG. 3 in a low-force gripping mode.

As seen in FIGS. 3 and 4, wires 30 run across, and exterior to, the gripping surface 32 of each pair of pads 28 and form the first element of a gripping member which will initially contact a container 34 as it is gripped by the apparatus on the closing of gripper elements.

Wires 30 form a suitable gripping surface for many applications wherein a container 34 is merely being moved from one place to another. However, because of the low friction between container and wire, there is little or no grip by wires 30 on container 34 that would resist turning of the tube. Thus, the grip is wholly inappropriate for many operations including, for example, those wherein the grip is used to resist the torque associated with the unscrewing of a cap on the vial. Because this is so, it is usually desirable to close the grippers sufficient to utilize higher-friction, tighter-gripping, resilient, resin pads as the gripping surface.

Figure 5:
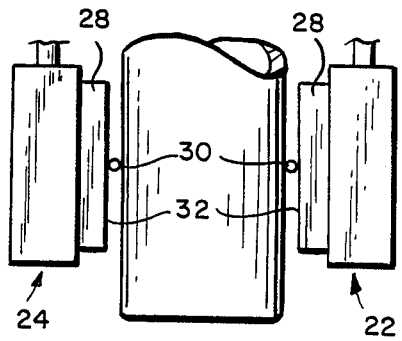
FIG. 5 illustrates, schematically, the gripper of FIG. 3 in a relatively high-force gripping mode.

As seen in FIGS. 3 through 5, the gripper means moves into gripping position, and wire 30 is forced into the resilient gripping pad 28 until the surface of pad element 28 becomes the main gripping surface. Since pad element 28 is characterized by both a larger gripping area and, usually, a greater coefficient of friction, it becomes the principal gripping element and, when sufficient force is supplied to the container, readily resists any movement which might otherwise result from substantial forces being exerted on the container, e.g. torque required for capping and uncapping action.

Of course, such torque-resistance makes little or no direct use of the wire element 30. However, with many conveniently used elastomers, including such readily-cast, tough, and chemically resistance polyurethane compositions, there has been a serious problem of sticking of the container to the resilient pad elements. This problem is wholly avoided by the wire 30 being biased outwardly by the resilient pad. As the gripper members 22 and 24 are retracted and the grip on the container is released, the wire is at least partially expelled by the pad and acts as means to push the container before it and ejecting the container from the pad.

Figure 6:
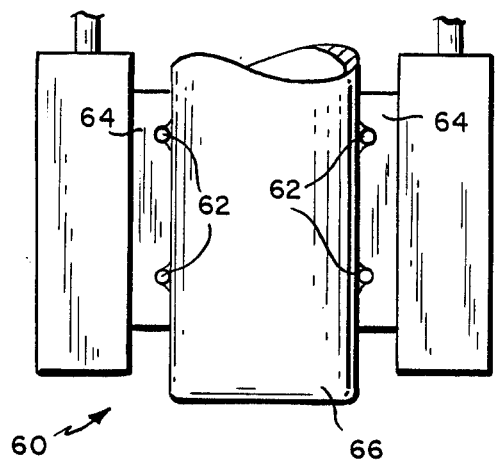
FIG. 6 illustrates another gripper member constructed according to the invention.

FIG. 6 illustrates, schematically, another embodiment of the invention 60 wherein a plurality of wires 62 are affixed across a single pad 64. This mode is particularly useful in that, when a pad has a substantial dimension, the use of multiple elements helps to achieve simultaneous release all along the container 66, thereby avoiding any undesirable tipping and agitation of container contents during the release.

Figure 7:
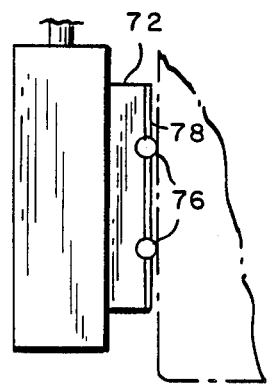
FIGS. 7 and 8 illustrate a captive-ball-type gripper element as an embodiment of the invention.
Figure 8:
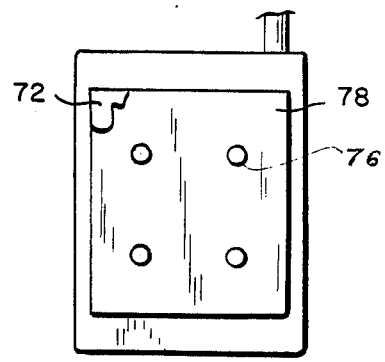

FIGS. 7 and 8 show how the second elements of a gripper means can be set into a pad 72. The pad comprises a first resilient pad formed of polyurethane which has semicircular receptacles molded therein for receiving ball bearing structures 76. Then a thin layer of a restraining sheet 78 of resin is laminated across the surface of pad 72, locking the balls 76 into place with a portion of their surfaces protruding to act as the "second" gripping elements. In operation, the balls will be pushed into the pad 72 during gripping. On release of the gripping force, the pad 72 will partially expel the balls 76 which will, in turn, push the article being gripped away from the surface.

Figure 9:
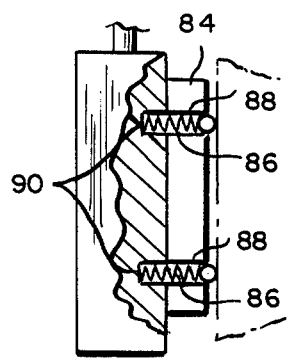
FIGS. 9 and 10 illustrate a spring-loaded gripper element according to the invention.
Figure 10:
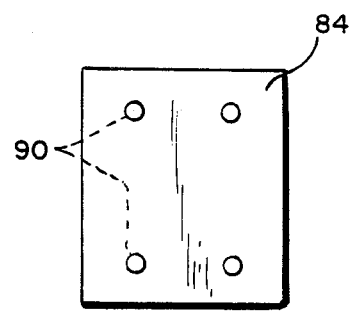

FIGS. 8 and 9 illustrate still another release gripping means wherein the principal bias is not achieved by a resilient gripping pad, but by mechanical biasing means such as springs 86 which are inserted into conduits 88 and anchored to the gripping member at 90. The gripping and article-pushaway features of the invention are similar to the other embodiments of the invention, but the design allows the selection of a wide variety of gradients of gripping pressure with respect to the strain exerted on the springs of an article being gripped. For example, different spring characteristics, even a mixture of spring characteristics in a single gripper, would allow any predetermined gradient of gripping pressure to be achieved as the gripper tightens about an article.

The particular motor means used to open and close the grippers are not shown because they form no part of the invention and many such devices are known in the art.

The mode of connection of the article-rejecting gripping element to the gripper is not critical. A curved wire such as seen in FIG. 1 can be fastened into holes in the clamp member as seen in FIG. 2 or it can be attached by brazing, welding or any other convenient and economical means.

It is also to be understood that the following claims are intended to cover all of the generic and specific features of the invention herein described and all statements of the scope of the invention which might be said to fall therebetween.

What is claimed is:

1. A tool for gripping and releasing articles, said tool comprising two opposed gripping members which are moveable, relative to each other, between article-gripping and article-releaes positions, at least a first said opposed gripping member having
   (a) a pad element having a gripping surface as a first gripping element;
   (b) a second gripping element having smaller gripping area than said pad element and mounted on said first gripping member such that its smaller gripping area (1) is in a normal position closer to the other of said opposed gripping members than is said gripping surface of said pad element and (2) is displaceable into said pad element on application of a gripping force thereto; thereby allowing said gripping surface of said pad element to become a primary gripping surface; and
   (c) wherein said pad element comprises biasing means to return said second element to said normal position on release of said gripping force, said second element forming positive means to push said article from said gripping surface of said pad element as it is returned to said normal position.

2. A tool as defined in claim 1 wherein a second opposed gripping member is constructed as is said first opposed gripping element.

3. A tool as defined in claim 1 wherein said biasing means is inherent in the properties of said pad element, said pad element being a resilient pad.

4. A tool as defined in claim 3 wherein said second gripping element is wire.

5. A tool as defined in claim 3 wherein said pad element is formed of an organic resin material.

6. A tool as defined in claim 1 wherein said second gripping element is a spring wire.

7. A tool as defined in claim 1 wherein said biasing means comprises mechanical biasing means partially housed within said pad element.

8. A tool as defined in claims 6 or 7 wherein said pad element is formed of an organic resin material.

9. In a process for gripping and releasing an article by a mechanical gripper comprising two gripper members that move back and forth, in relationship one to the other, from an open position to a closed position for gripping said article, the improvement comprising the steps of
   (a) carrying a biased article-ejecting means in an extended position on each said gripper member whereby said article-ejecting means extends beyond a principal gripping surface of said gripper members;
   (b) first contacting an article to be gripped with said article-ejecting means as said gripper members are moving towards said closed position;
   (c) then pushing said article-ejecting means backwardly against biased support into pad means on said gripper members until said pad means provides the principal surface for gripping said article when said gripper members are in said closed position; and
   (d) as the gripper members return to open position, pushing said article away from the surface of said pad means with said article-ejecting means as said article-ejecting means is moved into said extended position by said biased article-ejecting means.

10. A process as defined in claim 9 wherein said article-ejecting means is comprised of at least one wire.

* * * * *

UNITED STATES PATENT AND TRADEMARK OFFICE
CERTIFICATE OF CORRECTION

PATENT NO. : 4,740,025
DATED : 26 April 1988
INVENTOR(S) : Kenneth J. Nelson

It is certified that error appears in the above—identified patent and that said Letters Patent is hereby corrected as shown below:

Claim 1, Line 4   "article-releaes" should read --article-release--.

Signed and Sealed this

Twenty-third Day of August, 1988

Attest:

DONALD J. QUIGG

*Attesting Officer*   *Commissioner of Patents and Trademarks*